United States Patent [19]

Lawther

[11] Patent Number: 4,707,096
[45] Date of Patent: Nov. 17, 1987

[54] FILM INITIALIZATION REASSURING MECHANISM

[75] Inventor: Joel S. Lawther, Rochester, N.Y.

[73] Assignee: Eastman Kodak Company, Rochester, N.Y.

[21] Appl. No.: 2,530

[22] Filed: Jan. 12, 1987

[51] Int. Cl.$^4$ .............................................. G03B 1/66
[52] U.S. Cl. .................................... 354/215; 354/217
[58] Field of Search ............................... 354/215, 217

[56] References Cited

U.S. PATENT DOCUMENTS

| | | | |
|---|---|---|---|
| 3,688,668 | 9/1972 | Ort ..................................... | 95/31 FM |
| 4,134,657 | 1/1979 | Nomura ............................... | 354/212 |
| 4,334,753 | 6/1982 | Harvey ................................ | 354/289 |
| 4,340,291 | 7/1982 | Berg .................................... | 354/215 |
| 4,432,628 | 2/1984 | Sakurada et al. ................... | 354/289.12 |
| 4,492,446 | 1/1985 | Zawodny et al. ................... | 354/215 |
| 4,653,886 | 3/1987 | Desormeaux ....................... | 354/217 X |

Primary Examiner—Michael L. Gellner
Attorney, Agent, or Firm—Roger A. Fields

[57] ABSTRACT

When an unexposed filmstrip is advanced several frame widths in a camera to position the first available frame for exposure, a frame counter is changed from an original empty setting to a "1" setting. In addition, a visible indication is provided in response to the counter being changed to its "1" setting which confirms that the first frame is positioned for exposure. This is done to reassure the photographer that proper film winding and film initialization have occurred.

8 Claims, 5 Drawing Figures

FILM INITIALIZATION REASSURING MECHANISM

BACKGROUND OF THE INVENTION

1. Field of the Invention

The invention relates generally to photographic cameras. More particularly, the invention relates to a camera which, when loaded with a light-tight cartridge containing an unexposed filmstrip, will alert the user that the filmstrip has been initialized, i.e., advanced to position its first frame for exposure.

2. Description of the Prior Art

To load most 35 mm cameras, the film cartridge is inserted in a loading chamber of the camera and the forward end portion of a film leader projecting from a light-trapping slit in the cartridge is placed over a film take-up spool in a take-up chamber of the camera. In many cameras, the forward end portion of the film leader is manually attached to the take-up spool before a back door of the camera is closed. Then, an initial film winding operation is performed, for example, by pivoting a winding lever and depressing a shutter release button several times until the entire leader is wound onto the take-up spool and the first available frame on the filmstrip is positioned for exposure. In other cameras, the forward end portion of the film leader is automatically secured to the take-up spool at the beginning of the film winding operation. As the take-up spool is rotated, one or more circumferential teeth on the spool engage the forward end portion of the film leader in its perforations to wind the leader onto the spool and to position the first available frame on the filmstrip for exposure. A spring-like deflector or other suitable means may be provided on the back door of the camera for pressing the film leader against the take-up spool to facilitate engagement of the forward end portion of the leader by the teeth on the spool. After the first frame on the filmstrip is exposed, subsequent exposures are made by repeating the film winding and shutter releasing operations.

Each time a film frame is positioned for exposure, a frame counter in the camera is incremented to provide a frame number indication corresponding to the number of the positioned frame. A problem that sometimes exists, however, is that it may be difficult for the user to tell when the first available frame is positioned for exposure. Typically, the frame counter has an original empty indication and a first frame number indication which are separated by a series of three spaced dot-like indications. The frame counter is incremented four times to change from its original empty indication to its first frame number indication. This is in conformity with the requirement that the filmstrip must be advanced approximately four frame widths to wind the film leader onto the take-up spool and to position the first available frame for exposure. A window in the camera for successively observing the original empty indication, the three dot-like indications, and the first frame number indication is usually wide enough to permit the first frame number indication to at least partially enter the window after the filmstrip is advanced only three of the four frame widths. Thus, there is the possibility that the user seeing the first frame number indication in the window may attempt to take a picture before the first available frame is positioned for exposure.

SUMMARY OF THE INVENTION

According to the invention, the foregoing problem in prior art cameras is eliminated by providing a film initialization confirming mechanism in the camera which reassures the photographer that the first available frame is positioned for exposure.

Specifically, there is provided an improved camera of the type wherein a frame counter is adapted to display respective indications corresponding to successive frames on an unexposed filmstrip as each available frame is positioned for exposure and wherein the improvement comprises means, responsive to the frame counter displaying an indication corresponding to the first frame to be positioned for exposure, for producing a visible or audible confirming indication that the first frame is positioned for exposure.

BRIEF DESCRIPTION OF THE DRAWINGS

The invention will be described in connection with the drawings, wherein.

DESCRIPTION OF THE PREFERRED EMBODIMENT

The invention is disclosed as being embodied preferably in a 35 mm camera. Because the features of this type of camera are well known, the description which follows is directed in particular to photographic elements forming part of or cooperating directly with the disclosed embodiment. It is understood, however, that other elements not specifically shown or described may take various forms known to persons of ordinary skill in the art.

Figure 1:
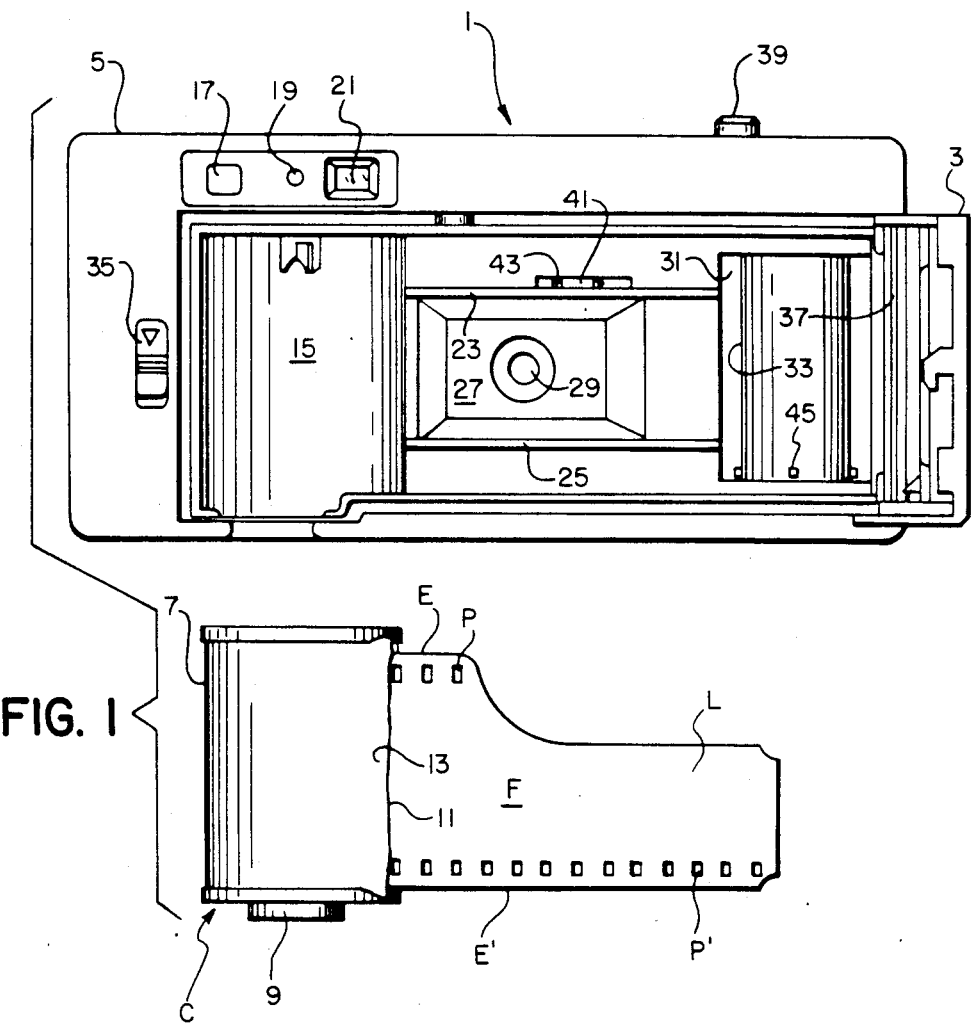
FIG. 1 is a rear elevation view of a camera and a 35 mm film cartridge, showing a rear door of the camera opened.

Referring now to the drawings and in particular to FIG. 1, a 35 mm camera 1 is shown with a back door 3 pivotally mounted on a rear portion of the camera body 5. The door 3 is opened to receive a known film cartridge C, such as one manufactured by Eastman Kodak Company. The film cartridge C comprises a light-tight container 7 housing a rotatably supported spool 9 on which is wound an edge-perforated 35 mm filmstrip F. The filmstrip F has an upper row of perforations P adjacent a longitudinal edge E and a lower row of perforations P' adjacent a longitudinal edge E'. A leader section L of the filmstrip F projects from a plush-lined, light trapping slit 11 in a throat 13 of the cartridge C and has a forward end portion whose width is approximately one-half of the width of the remainder of the filmstrip. The 35 mm camera includes a number of known elements, such as a loading chamber 15 for receiving the cartridge C; a flash ready lamp 17 for a built-in electronic flash, now shown; a low light warning lamp 19; a viewfinder window 21; a pair of substantially parallel film rails 23 and 25; a film exposure window 27; an objective lens 29; a film take-up chamber 31 housing a film take-up spool 33 or drum; a manually operable latch 35 for securing the back door 3 closed; a pressure plate 37 spring-supported on the inside of the back door for holding successive frames on the filmstrip F flat on the pair of film rails 23 and 25 during film exposure at the exposure window 27; and a shutter release button 39 manually depressible to initiate film exposure.

To load the 35 mm camera 1, the film cartridge C is inserted in the loading chamber 15. Then, an intermediate portion of the film leader L is placed over a metering sprocket 41 to position one or more of the perforations P in the leader in engagement with respective teeth 43 on the sprocket. In addition, the forward end portion of the leader L is placed over the take-up spool 33 to position one or more of the perforations P' in the leader in engagement with respective teeth 45 on the spool. An initial film winding operation is performed in a conventional manner by alternately pivoting a winding lever, not shown, and depressing the shutter release button four times to cause the take up spool 33 to be rotated a like number of times. This advances the filmstrip F approximately four frame widths, which is sufficient to wind the film leader L onto the take-up spool 33 and to position the first available frame A on the filmstrip at the exposure window 27. See FIGS. 2 and 5.

Figure 2:
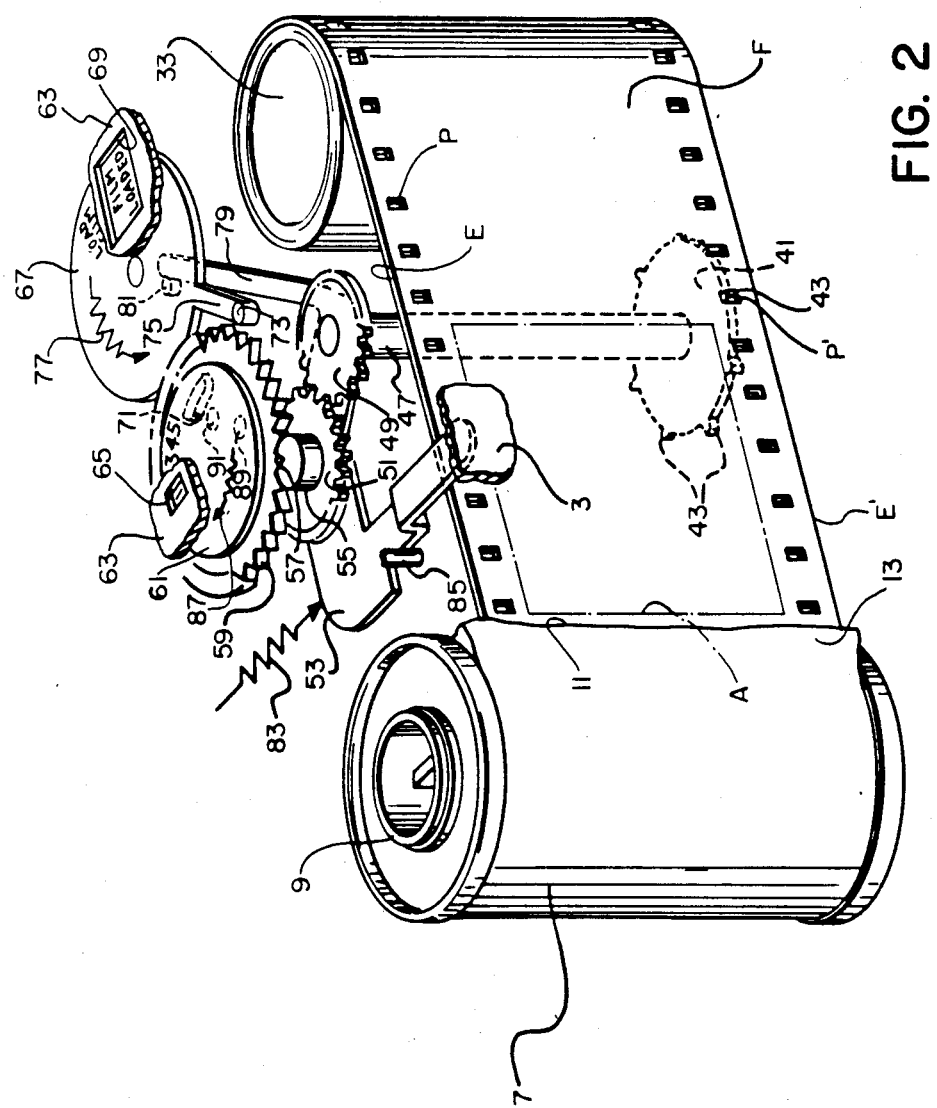
FIG. 2 is a rear perspective view of the film cartridge, a frame counter, and a film initialization reassuring mechanism in accordance with a preferred embodiment of the invention.
Figure 3:
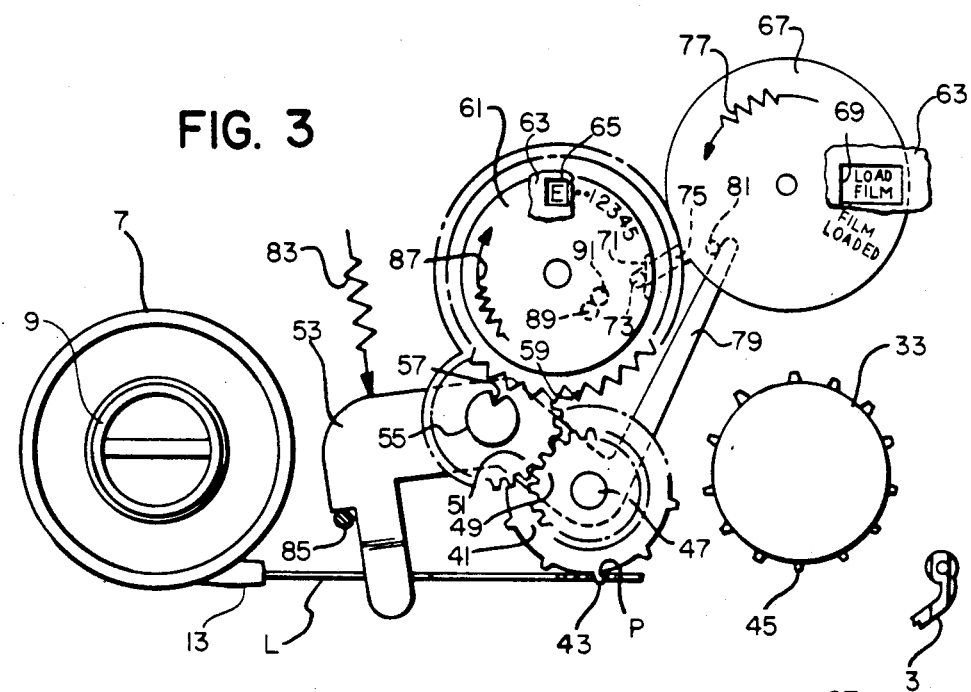
FIGS. 3, 4 and 5 are top plan views of the various apparatus depicted in FIG. 2, serially depicting operation of the film initialization reassuring mechanism.
Figure 4:
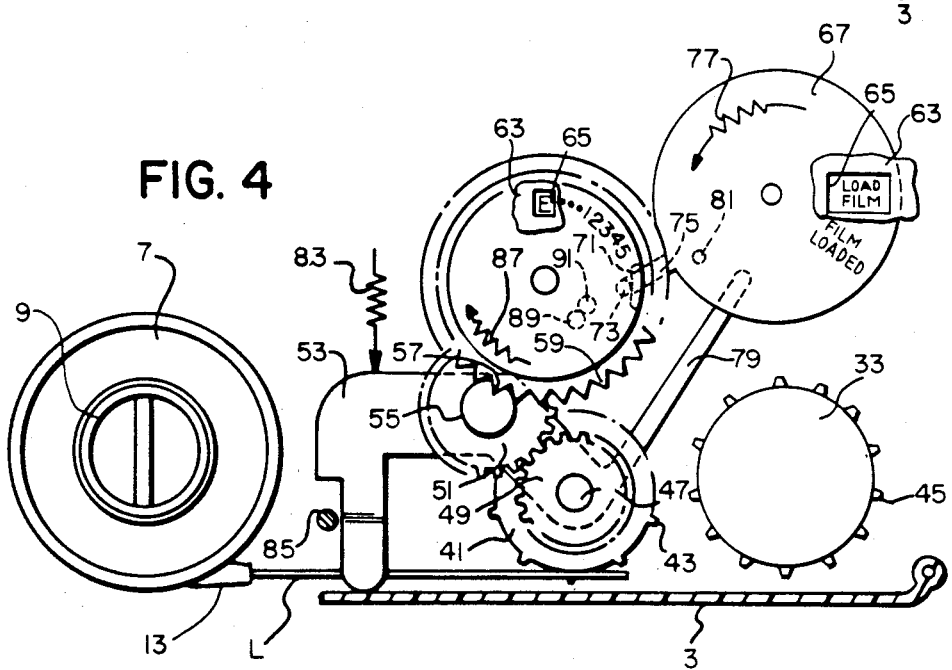

As shown in FIGS. 2 and 3, a coaxial shaft 47 connects the metering sprocket 41 and a metering gear 49 to enable the sprocket and the gear to rotate in unison. The metering gear 49 continuously engages a counter gear 51 which is rotatably mounted atop a swing plate 53. The swing plate 53 is supported on the shaft 47, beneath the metering gear 49, for pivotal movement about the shaft without disengaging the counter gear 51 from the metering gear. A motion transmitting stud 55 is coaxially fixed atop the counter gear 51 and has a single recess 57 for receiving successive peripheral teeth 59 of a rotatable counter disk 61 to rotate the disk in accordance with rotation of the counter gear. When the rear door 3 is closed, as shown in FIG. 4, it abuts against the swing plate 53 to maintain the motion-transmitting stud 55 in a position against at least one of the peripheral teeth 59 of the counter disk 61. The counter disk 61 is located beneath a top surface 63 of the camera body 5 and has thirty-six evenly spaced numbered settings represented by the numbers "1, 2, 3, 4, 5, ... 36" imprinted on the disk. These numbers correspond to successive frames on the filmstrip F. An original empty setting of the counter disk 23 is represented by the letter "E" imprinted on the disk. This is to indicate that the camera is empty. The original empty indication "E" is separated from the first frame number indication "1" by a series of three evenly spaced dot-like indications ". . ." imprinted on the disk. When the filmstrip F is initially wound onto the take-up spool 33 to position the first available frame A for exposure, the metering sprocket 41 is rotated by the winding movement of the filmstrip to increment the counter disk 61 four times to remove the indicator "E" from a frame indicator window 65 in the top surface 63 of the camera body 5 and to move the indicator "1" into the window. This is in conformity with the requirement that the filmstrip F must be advanced approximately four frame widths to initialize the filmstrip.

Figure 5:
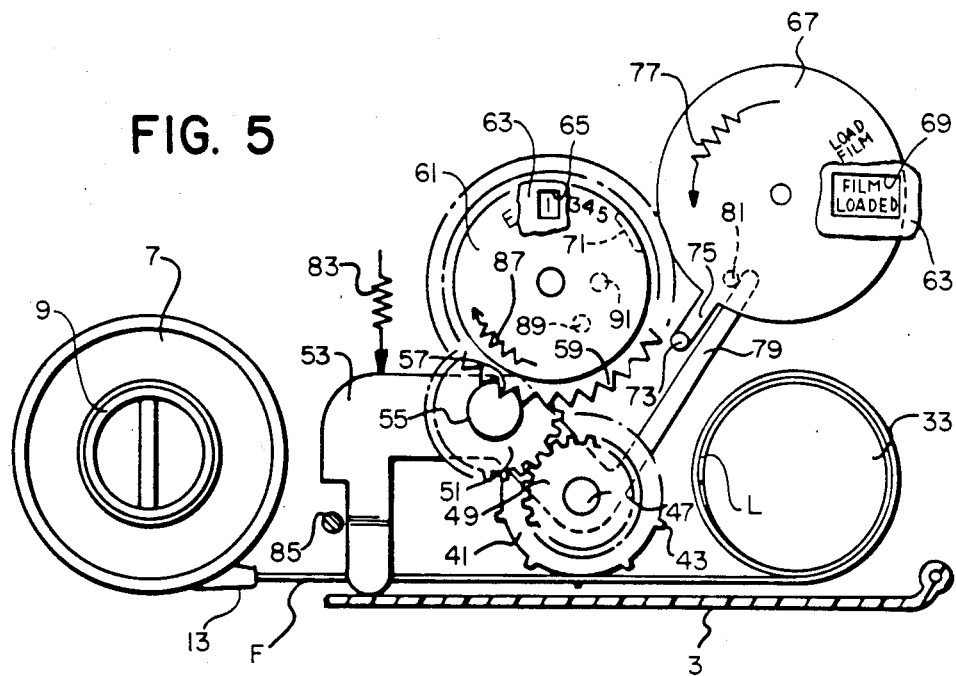

A rotatable indicator disk 67 located beneath the top surface 63 of the camera body 5 has an original empty setting in which a "LOAD FILM" indication imprinted on the disk is positioned in a window 69 in the top surface, as shown in FIGS. 3 and 4 and an alternative loaded setting in which a "FILM LOADED" indication imprinted on the disk is positioned in the window, as shown in FIGS. 2 and 5. The counter disk 61 includes a retaining member 71 located on the underside of the counter disk to engage a stud 73 on a finger-like extension 75 of the indicator disk 67 to secure the indicator disk in its original empty setting "LOAD FILM" when the counter disk is in its original empty setting "E", as shown in FIGS. 3 and 4. Conversely, when the counter disk 61 is in its first numbered setting "1", as shown in FIGS. 2 and 5, the retaining member 71 is moved clear of the stud 73 to permit the indicator disk 67 to be moved by a relatively light actuating spring 77 to the loaded setting "FILM LOADED", as shown in FIGS. 2 and 5. A finger-like extension 79 of the swing plate 53 is disposed to limit rotation of the indicator disk 67 to its loaded setting when the rear door 3 is closed, as shown in FIGS. 2 and 5, by engaging a stud 81 located on the underside of the indicator disk.

When the rear door 3 is opened, as shown in FIG. 3, a relatively heavy separating spring 83 urges the swing plate 53 to pivot in a counter-clockwise direction about the shaft 47 into abutment against a stop pin 85 located on a frame portion of the camera body 5. This causes two things to happen. First, the finger-like extension 79 of the swing plate 53 is swung in engagement with the stud 81 of the indicator disk 67 to return the indicator disk to its original empty setting "LOAD FILM". Simultaneously, the motion-transmitting stud 57 is moved out of its position against at least one of the peripheral teeth 59 of the counter disk 61 to release the counter disk. This allows a relatively light initializing spring 87 to rotate the counter disk 61 to initialize the disk to its original empty setting "E". A stop pin 89 located on the underside of the counter disk 61 contacts a fixed pin 91 located on a frame portion of the camera body 5 to halt the counter disk 61 at its original empty setting.

When the rear door 3 is re-closed, as shown in FIG. 4, it pivots the swing plate 53 in a clockwise direction about the shaft 47 away from the stop pin 85. This causes two things to happen. First, the finger-like extension 79 of the swing plate 53 is swung out of engagement with the stud 81 of the indicator disk 67, leaving the stud engaged by the retaining member 71 of the counter disk 61 to hold the counter disk in its original empty setting "E". Simultaneously, the motion-transmitting stud 57 is returned to its position against at least one of the peripheral teeth 59 of the counter disk 61.

The invention has been described with reference to a preferred embodiment. However, it will be appreciated that variations and modifications of the invention can be effected by a person skilled in the art without departing from the scope of the invention. For example, the indicator disk 67 may have the indications "EMPTY" and "READY" instead of the indications "LOAD FILM" and "FILM LOADED". All that is necessary is that the indicator disk 67 confirm that the first available frame A on the filmstrip F is positioned for exposure when the counter disk 61 is in its first numbered setting "1".

I claim:

1. An improved photographic camera of the type wherein a frame counter is adapted to provide respective visible indications corresponding to successive frames on an unexposed filmstrip as each one of the frames is positioned for exposure, and wherein the improvement comprises:

means, responsive to said frame counter providing a visible indication corresponding to the first frame to be positioned for exposure, for providing a reassuring indication that the first frame is positioned for exposure.

2. An improved photographic camera of the type wherein (a) an unexposed filmstrip is advanced to position successive frames on the filmstrip for exposure and (b) a frame counter is changed from an original empty setting to a first numbered setting corresponding to the first frame on the filmstrip as the filmstrip is advanced to position its first frame for exposure, and wherein the improvement comprises:

indicator means, responsive to said frame counter being changed from its original empty setting to its first numbered setting, for providing a reassuring indication that the first frame is positioned for exposure.

3. The improvement as recited in claim 2, wherein said indicator means is biased to provide said reassuring indication, and said frame counter includes means for preventing said indicator means from providing the reassuring indication when the frame counter is in its original empty setting and for permitting the indicator means to provide said reassuring indication when the frame counter is in its first numbered setting.

4. An improved photographic camera of the type wherein (a) an unexposed filmstrip is advanced to position successive frames on the filmstrip for exposure as the filmstrip is wound onto a take-up spool and (b) a frame counter is incremented to provide a numbered indication of the film frame positioned for exposure each time a metering sprocket engaging successive perforations in the filmstrip is rotated a predetermined angle, and wherein the improvement comprises:

means, responsive to said frame counter being incremented to provide a numbered indication that the first frame is positioned for exposure, for providing a reassuring indication that the first frame is positioned for exposure.

5. An improved photographic camera of the type wherein (a) an unexposed filmstrip is advanced to position successive frames on the filmstrip for exposure and (b) a frame counter is rotated from an original empty setting to a first numbered setting corresponding to the first frame on the filmstrip as the filmstrip is advanced to position its first frame for exposure, and wherein the improvement comprises:

indicator means spring-urged for movement from an initial setting in which said indicator means provides a visible indication that the filmstrip has not been advanced to position the first frame for exposure to a second setting in which the indicator means provides a visible indication that the first frame is positioned for exposure; and said frame counter includes means for engaging said indicator means to secure the indicator means in its initial setting when the frame counter is in its original empty setting and for releasing said indicator means to permit the indicator means to move to its second setting when the frame counter is in its first numbered setting.

6. An improved photographic camera of the type wherein (a) an unexposed filmstrip is advanced from a light-tight cartridge to position successive frames on the filmstrip for exposure, (b) a frame counter is rotated from an original empty setting to a first numbered setting corresponding to the first frame on the filmstrip as the filmstrip is advanced to position its first frame for exposure, and (c) a door is opened to load and remove the cartridge into and from said camera, and wherein the improvement comprises:

indicator means spring-urged for movement from an initial setting in which said indicator means provides a visible indication that the filmstrip has not been advanced to position the first frame for exposure to a second setting in which the indicator means provides a visible indication that the first frame is positioned for exposure;

said frame counter includes means for engaging said indicator means to secure the indicator means in its initial setting when the frame counter is in its original empty setting and for releasing said indicator means to permit the indicator means to move to its second setting when the frame counter is in its first numbered setting; and return means, responsive to said door being opened when the first frame is positioned for exposure, for returning said indicator means to its initial setting.

7. The improvement as recited in claim 6, wherein said return means is disposed to prevent said indicator means from being moved from its initial setting to its second setting when said door is opened.

8. The improvement as recited in claim 7, wherein said return means is disposed to limit movement of said indicator means to its second setting when said door is closed.

* * * * *